(12) United States Patent
Snider et al.

(10) Patent No.: US 11,481,370 B1
(45) Date of Patent: Oct. 25, 2022

(54) DEVICES, SYSTEMS, AND METHODS FOR OPTIMIZATION OF DATA SETS

(71) Applicant: R&D Industries, Inc., Milford, IA (US)

(72) Inventors: Keith Snider, Ames, IA (US); Satheesh Yadava, Troy, MI (US); Christopher Van Oort, Ames, IA (US)

(73) Assignee: R&D Industries, Inc., Milford, IA (US)

( * ) Notice: Subject to any disclaimer, the term of this patent is extended or adjusted under 35 U.S.C. 154(b) by 227 days.

(21) Appl. No.: 16/669,369

(22) Filed: Oct. 30, 2019

Related U.S. Application Data

(60) Provisional application No. 62/752,572, filed on Oct. 30, 2018.

(51) Int. Cl.
*G06F 16/22* (2019.01)
*G06F 16/23* (2019.01)
*G06F 16/28* (2019.01)

(52) U.S. Cl.
CPC ...... *G06F 16/2246* (2019.01); *G06F 16/2282* (2019.01); *G06F 16/2379* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 11,030,187 B1* | 6/2021 | Boodman | G06F 16/2246 |
| 2007/0027884 A1* | 2/2007 | Heger | G06F 16/9027 |
| 2011/0246503 A1* | 10/2011 | Bender | G06F 16/258 |
| | | | 707/769 |
| 2014/0136498 A1* | 5/2014 | Finis | G06F 16/219 |
| | | | 707/695 |
| 2015/0281389 A1* | 10/2015 | Firsov | G06F 16/282 |
| | | | 709/214 |
| 2016/0350380 A1* | 12/2016 | Finis | G06F 16/316 |
| 2017/0153973 A1* | 6/2017 | Schatzl | G06F 16/1727 |
| 2017/0228468 A1* | 8/2017 | Kang | G06F 16/9024 |

OTHER PUBLICATIONS

Vadim Tropashko, "One More Nested Intervals vs. Adjacency List Comparison", Aug. 9, 2008, Publisher: https://vadimtropashko.wordpress.com/2008/08/09/one-more-nested-intervals-vs-adjacency-list-comparison/.

Daniel Aioanei et al., "General Trees Persisteed in Relational Databases", Jun. 23, 2003, Publisher: CodeProject.

(Continued)

*Primary Examiner* — Richard L Bowen
(74) *Attorney, Agent, or Firm* — Dentons Davis Brown, P.C.; Matthew Warner-Blankenship (57) ABSTRACT

The disclosure is related to a system for storing and managing hierarchical relationships in a data set. The data set has a plurality of nodes, including root nodes having trees and subtrees, the tree and subtrees including parent, sibling, and child nodes. Each node in the data set has bound values and the bound values of the root nodes are fixed and of equal width. The system further includes processor on a server constructed and arranged to execute a series of steps for optimizing the data set. The processor constructed and arranged to recalculate bound values for updated nodes, sibling nodes and associated subtrees when nodes are updated.

20 Claims, 12 Drawing Sheets

(56) References Cited

OTHER PUBLICATIONS

Vadim Tropashko, "Integer Labeling in Nested Intervals Model", Publisher: DBAzine.com.
Miike Hillyer, "Managing Hierarchical Data in MySQL", , Publisher: mikehillyer.com/articles/managing-hierarchical-data-in-mysql/.
Vadim Tropashko, "Nested Intervals Tree Encoding with Continued Fractions", 2004.
Vadim Tropashko, "Nested Intervals with Farey Fractions", Jan. 18, 2004.
Vadim Trophasko, "Nested Intervals Tree Encoding in SQL", Jun. 2, 2005, pp. 47-52, vol. 34, No. 2, Publisher: SIGMOD Record.
Vadim Tropashko, "Relocating Subtrees in Nested Intervals Model", , Publisher: DBAzine.com.
"The simplest way to do tree-based queries in SQL", "a dirtSimple Blog", Nov. 6, 2010, Page(s) dirtsimple.org/2010/11/simplest-way-to-do-tree-based-queries.html, Publisher: PJE on Programming.
Trees, https://vadimtropashko.files.wordpress.com/2011/07/ch5.pdf.
Vadim Tropashko, "Trees in SQL: Nested Sets and Materialized Path", , Publisher: DBAzine.com.

\* cited by examiner

FIG. 1

| Id | Monitorable | Parent_id |
|---|---|---|
| 1 | Group | Null |
| 2 | Location 1 | 1 |
| 3 | Location 2 | 1 |
| 4 | Probe 1 | 2 |
| 5 | Probe 2 | 2 |
| 6 | Probe 3 | 2 |
| 7 | Probe 1 | 3 |
| 8 | Probe 2 | 3 |
| 9 | Probe 3 | 3 |

DEVICES, SYSTEMS, AND METHODS FOR OPTIMIZATION OF DATA SETS

CROSS-REFERENCE TO RELATED APPLICATION(S)

This application claims the benefit under 35 U.S.C. § 119(e) to U.S. Provisional Application 62/752,572, filed Oct. 30, 2018, and entitled Optimizations to Nested Interval Data Sets, which is hereby incorporated herein by reference in its entirety for all purposes.

TECHNICAL FIELD

The disclosure relates to an improvement in the functioning of computers, computer programs, and related systems.

BACKGROUND

The disclosure relates to improvements in the functioning of computers and computer programs. Modeling of the world and/or complex structures through data structures has been done in various areas including science and humanities. For example, k-dimensional trees ("k-d trees") are sometimes used to model stochastic, spontaneous, and multidimensional systems such as astronomy, computer networks, biology, computer vision, and other applications in artificial intelligence and machine learning.

Relational databases are widely used for organizing and handling data. Traditional relational databases are inefficient for handling hierarchical (parent-child) relationships. Some hierarchical relational databases can support modeling and/or storing parent-child relationships through structural organization methods, such as tree encoding and/or other architecture implementations such as adjacency lists, adjacency matrices, nested set models, and nested interval models, among others. These known hierarchical relational databases are inefficient for use with frequently changing data sets.

There is a need in the art for methods and related system and devices for optimizing hierarchical relational databases for use with frequently changing data sets.

BRIEF SUMMARY

Disclosed herein are various systems, methods, and devices for managing, storing, and optimizing hierarchical relationships within data sets.

One general aspect includes a system for storing and managing hierarchical relationships including a stored data set. The data set includes a first root node including a first tree, the first tree including at least one first subtree. The data set also includes a second root node including a second tree, the second tree including at least one second subtree. The data set also includes a plurality of parent, child, and sibling nodes. The system also includes a processor, the processor constructed and arranged to execute a series of commands, where: each tree and subtree include at least one node, each node includes bound values and the bound values of the first parent node and the second parent node are fixed and of equal numerical width, and the processor is constructed and arranged for recalculating bound values for sibling nodes and associated subtrees when a node is updated. Other embodiments of this aspect include corresponding computer systems, apparatus, and computer programs recorded on one or more computer storage devices, each configured to perform the actions of the methods.

Implementations may include one or more of the following features. The system where the stored data set is arranged as a nested interval set with adjacency matrices. The system where the data set is stored on a server. The system where the processor is constructed and arranged for inserting new nodes into the data set. The system where gaps are created in the data set when nodes are deleted. The system further including a gap table where: the gap table is constructed and arranged to store data regarding gaps within the data set and an entry is created in the gap table when a gap is created within the data set. The system further where the gap table is constructed and arranged to remove the entry when the gap is filled. Implementations of the described techniques may include hardware, a method or process, or computer software on a computer-accessible medium.

Another general aspect includes a method for storing and managing hierarchical data sets including: arranging a data set including a plurality of nodes into trees and subtrees, calculating and assigning bound values to each of the plurality of nodes, fixing the bound values for root nodes such that the bounds for root nodes are of equal width, updating a node, and recalculating bound values for nodes sharing the same parent node as the updated node and the subtrees of those nodes. Other embodiments of this aspect include corresponding computer systems, apparatus, and computer programs recorded on one or more computer storage devices, each configured to perform the actions of the methods.

Implementations may include one or more of the following features. The method furthering including de-gapping the data set. The method further including tracking gaps created within the data set. The method further including storing gap data in a table. The method further including inserting a new node into a gap within the data set. The method further including inserting a sibling node into a gap and recalculating the sibling nodes subtree. The method further including removing the gap data from the table when the gap is filled. Implementations of the described techniques may include hardware, a method or process, or computer software on a computer-accessible medium.

One general aspect includes a system for managing data sets including: a server; a processor in communication with the server, the processor constructed and arranged to execute a series of steps; and a nested interval plus adjacency matrix data set stored on the server. The system where the data set includes a plurality of root, parent, sibling, and child nodes, each node including bound values. The system where the bound values of root nodes are fixed and of equal width. The system where the processor is constructed and arranged to update a node and recalculate bound values of the updated node, the sibling nodes of the updated node and the respective child nodes of the updated node and the sibling nodes. Other embodiments of this aspect include corresponding computer systems, apparatus, and computer programs recorded on one or more computer storage devices, each configured to perform the actions of the methods.

Implementations may include one or more of the following features. The system where the processor is further constructed and arranged to de-gap the data set. The system further including a gap data table constructed and arranged to store data regarding gaps in the data set. The system where the processor is further constructed and arranged to insert new nodes into gaps in the data structure. The system where the gap data table is stored on the server. The system where the processor is further constructed and arranged to fill gaps in the data set by moving sibling nodes into the gap and recalculating bound values for the moved sibling node and the subtree of the sibling node. Implementations of the described techniques may include hardware, a method or process, or computer software on a computer-accessible medium.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

The various implementations and embodiments disclosed and contemplated herein relate to systems, methods, and associated devices for improving and optimizing the storage, maintenance, and configuration of hierarchical relational data sets. Particularly, systems and methods for optimizing, updating, and changing the data sets. Further, the systems and methods described herein represent a technical improvement over the prior art in that they allow for optimizing and expanding the utility of hierarchical relational data sets, as would be readily appreciated.

Figure 3A:
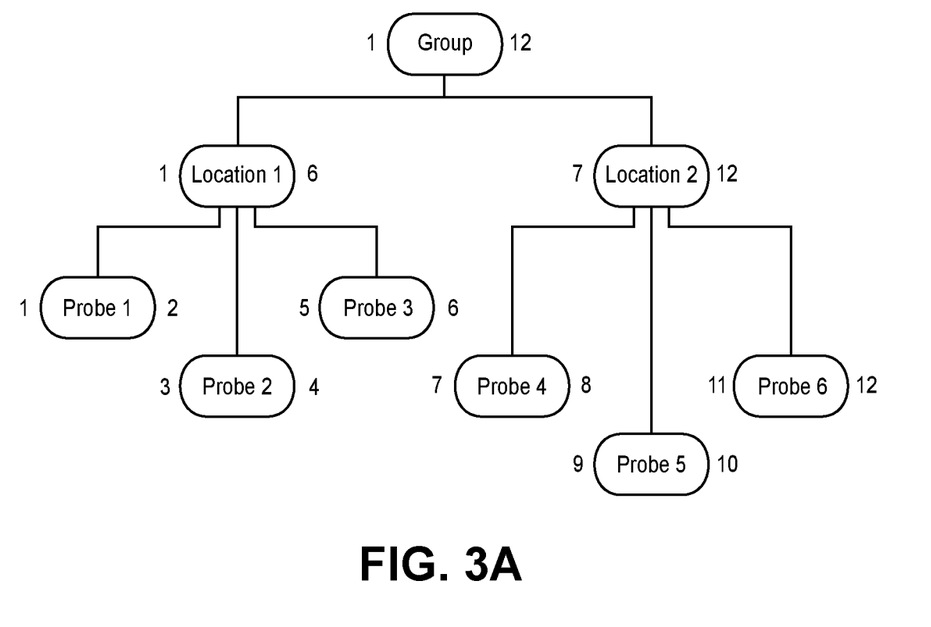
FIG. 3A is a schematic depiction of a nested set model, according to one implementation.
Figure 3B:
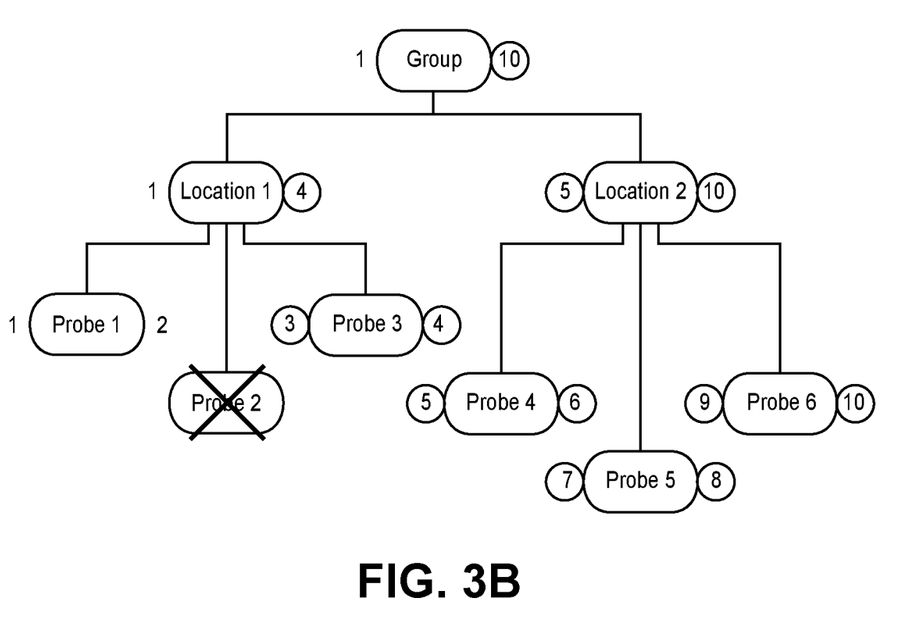
FIG. 3B is a schematic depiction of the nested set model of FIG. 3A with one node removed, according to one implementation.
Figure 4:
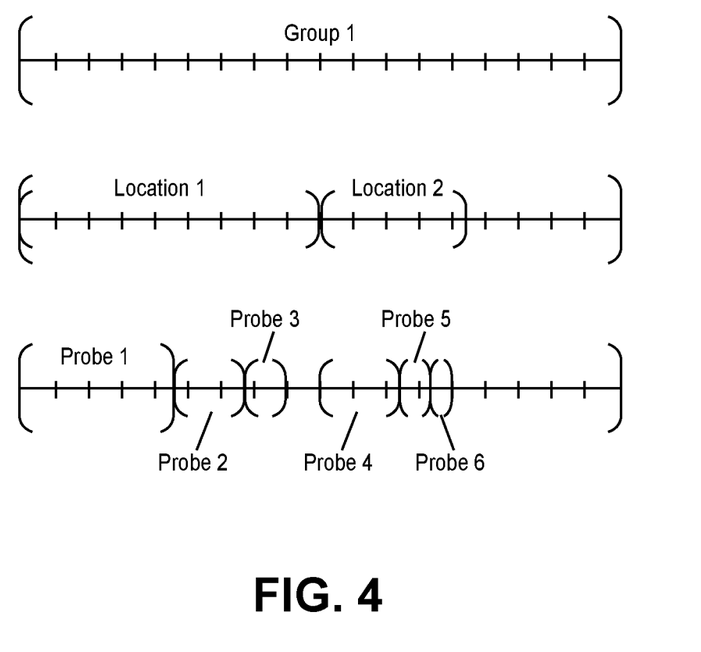
FIG. 4 is a schematic depiction of a nested interval model, according to one implementation.

Many different hierarchical data structures are known such as a hierarchical relationship tree (FIG. 1), an adjacency list model (FIG. 2), a nested set model (FIGS. 3A-3B), and a nested interval model (FIG. 4). These known data structures have advantages and disadvantages for the storage and configuration of data, especially with respect to relational databases.

Figure 1:
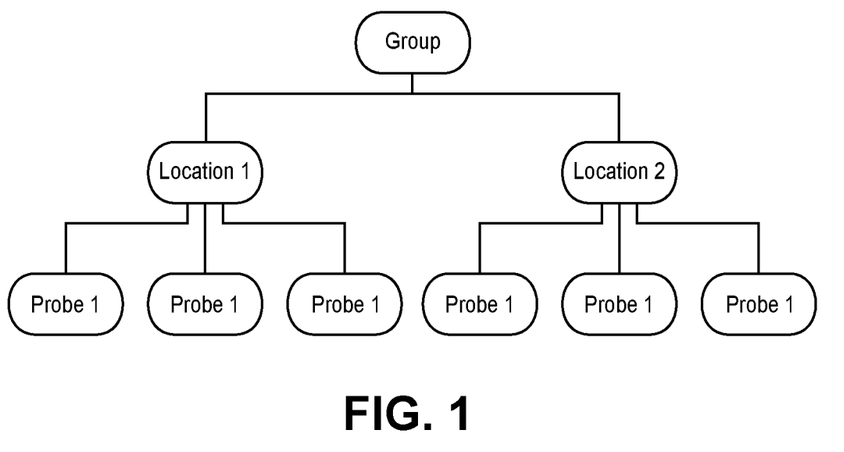
FIG. 1 is a schematic depiction of a hierarchical relationship tree, according to one implementation.
Figure 2:
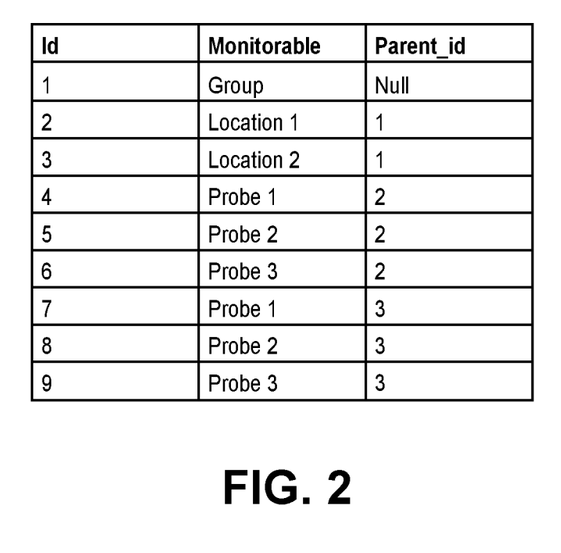
FIG. 2 is a depiction of an adjacency list model, according to one implementation.

An exemplary prior art hierarchical relationship tree is shown in FIG. 1. Relationship trees are capable of storing parent-child relationships but are inefficient. An exemplary prior art adjacency list model is shown in FIG. 2. Adjacency lists are commonly used for storing hierarchical data due to ease of understanding and maintenance. Adjacency lists, and other prior methods that include tree encoding, allow for computationally efficient math for nodes at various levels of the list/structure (parent, child, ancestor, etc.) and ease of moving subtrees within the structure. In an adjacency list each node is given an id and the node is stored with a reference to its parent's node id. Adjacency lists are optimal for small data sets and data sets where the distance between the highest parent and lowest child is small. Queries to find a node's child are inefficient because the table must be joined with itself at every level of the hierarchy. This increased complexity reduces the level of performance as the depth of child nodes increase.

FIG. 3A shows an exemplary nested set model. In a nested set model, hierarchical relationships are stored using left and right bound values, such as 1 and 12 for the Group 1 of FIG. 3A. Each child node, in a nested set model, has bound values within the bound values of its parent nodes. For example, if node A has bound values between the bound values of node B then node A is a child of node B. In FIG. 3A, Location 1 has bound values of 1 and 6 which are between the bound values of Group 1 (1 and 12) as such Location 1 is a child of Group 1. The use of bound values can improve query time because all children of a node have bound values contained within the parent node's bound vales.

In a nested set model, a sibling is a node (or item) in the model at the same hierarchical level as another node. For example, in FIG. 3A, Location 2 is a sibling of Location 1, because they are on the same hierarchical level. In a nested set model, a node's left bound value is the value of its left sibling's right bound value plus 1. As shown in FIG. 3A, Location 2's left bound value is 7 (6 (Location 1's right bound value) plus 1).

Use of nested set models can improve query times but nested set models are not efficient for use with changing data sets. Each time a node is added or deleted within the data set the bound values of each node must be recalculated. As such, frequent changes to the data set degrade performance and the degraded performance increases as the data set grows. As can be seen from FIG. 3B, when Probe 2 was deleted from the data set each of the circled bound values had to be recalculated—every bound value to the right of the deleted node had to be recalculated. Further, in a data set having more than one group each item in the other groups would also have to be recalculated in order to eliminate any gaps in the structure. Gaps can make queries and other mathematical operations slower and more difficult resulting in degradation of service. Further, gaps waste space within the tree.

FIG. 4 shows an exemplary nested interval data structure. In a nested interval data structure, each node or item in the data set has left and right bound values, such that each child's bound values are within the parent's bound values. In a nested interval data structure, each subsequent sibling under each parent gets half the value (space) as its left sibling. For example, shown in FIG. 4, Group 1 has values from 1 to 18, and Location 1, Group 1's child, has values from 1 to 9 and Location 2 has values from 9 to 13.5, for an absolute amount of 4.5 (half of 9). This process of assigning right siblings half the space (value) of their nearest left sibling creates a data structure in which the right value of the parent will never be reached, in other words an infinite series. As such, an infinite number of siblings can be placed under each parent node in a nested interval data structure.

Nested interval models can have improved query times, similar to nested sets, discussed above. Additionally, there is predictability in the value of the next interval in a nested interval structure. Yet, in nested interval models, the left and right bound values must be recalculated if a node is added, deleted or moved. As such, similar to nested sets, described above, nested interval models are not efficient for use with data sets that change frequently.

The various prior known data structures described above can store and manage hierarchical relationships but are not able to efficiently handle large and frequently changing data sets. Particularly when working with nested intervals and nested sets, any time a node is added or deleted from the data set, the bound values must be recalculated and reassigned—often for an entire set of trees. These recalculation operations scale linearly, such that with a large data set any updates or changes to the data set are slow and inefficient.

As an example, under prior art systems, if there are one million (1,000,000) nodes in a data set stored in nested intervals, if one (1) item is added, deleted, or moved, one-million (1,000,000) recalculation operations would have to be performed. In another example, if a node or other parent node is moved to a different tree, the system must recalculate the matrix for every node in the dataset. These recalculation operations lead to inefficiencies and issues with data scaling.

Disclosed herein are various systems and methods for optimizing various data structures including nested interval data sets such that use with large, changing data sets is practical and efficient. The various implementations discussed herein are described with reference to undirected graph sets, but directed graph sets may also be used as would be understood by those of skill in the art.

In some implementations of these systems and methods, depicted in the figures generally at 10, a nested interval structure is combined with an adjacency matrix to create a fast data structure. By using nested intervals plus adjacency matrices, users can leverage existing knowledge and/or integrate complex modeling into existing relational databases. The various implementations described herein are applicable via exact and/or derivative implementations to other graph data types—such as undirected trees, directed trees, r-trees, compressed tree data structures such as kdbTrees, other multidimension spatial graphs, and others—as would be appreciated by those of skill in the art in light of this disclosure. Various implementations of the disclosed systems and methods can be used in connection with any graph or tree that can be encoded into an adjacency matrix with nested intervals and can be optimized and yield the performance gains described herein, as would be appreciated.

It is understood that various implementations of the system 10 provide one or more computers that can be configured to perform particular operations or actions by virtue of having software, firmware, hardware, or a combination of them installed on the system that in operation causes or cause the system 10 to perform the actions. One or more computer programs can be configured to perform particular operations or actions by virtue of including instructions that when executed by data processing apparatus cause the apparatus to perform the actions such as via a processor, processors, or other software or hardware component that can be used to implement the system 10 discussed herein.

It is further understood that the system 10, according to some implementations, executes one or more algorithms on computer-readable media via a processor or processors. In some implementations, the processor is in communication with the server, the server storing the data structure. In further implementations, the processor is a 1-GHz single-core processor. In further implementations, the system 10 includes one or more 4-GHz quad-core processors. Of course, various other software and/or hardware components may be implemented with the system 10 as would be understood by those of skill in the art.

Figure 5:
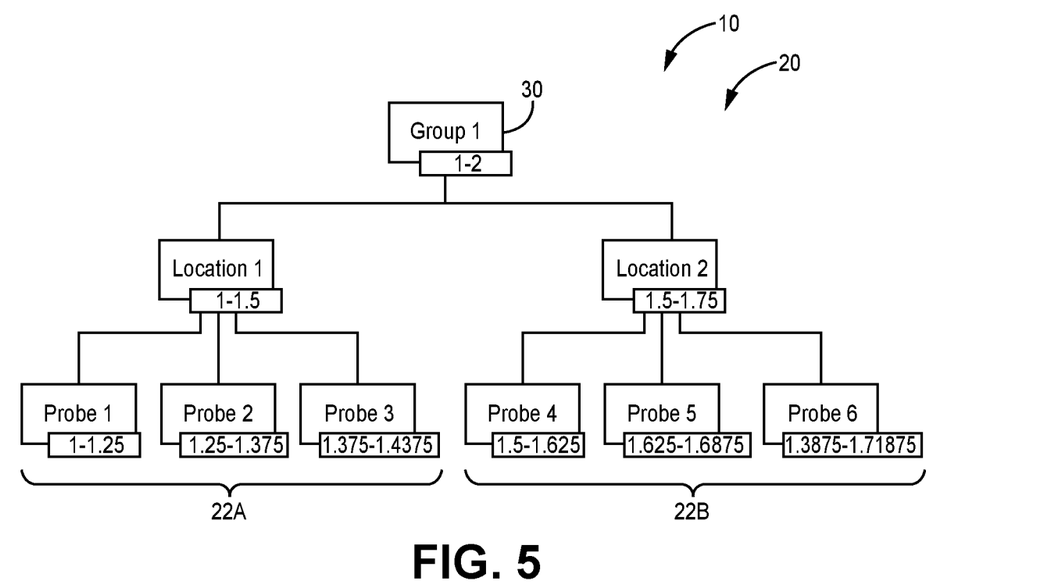
FIG. 5 is a schematic depiction of the system with an adjacency matrix with nested intervals, according to one implementation.

In some implementations, the system 10 is configured such that only the relevant and necessary nodes and subtrees in nested intervals are updated, rather than all the nodes in the database when nodes are moved. As shown in FIG. 5 every node 30 at the top of the tree 20 has bounds (here 1-2) that are a set numerical value and width that will not change as the subtree(s) 22A-B are updated. By making the bounds at the top of the tree 20 fixed values, it can be ensured that the bounds of the child nodes will never be outside the bounds of the relevant parent node. In various additional implementations, the bounds for all root nodes—the nodes 30 at the top of a tree 20—are of equal numerical value, such that the absolute value/width of each root node in the dataset is the same.

When child nodes within the subtrees 22A-B are updated—moved, inserted, deleted—only the relevant nodes of the subtrees (22A-B) must be recalculated. Relevant subtrees include the subtrees and nodes of sibling nodes to the right of the updated node and the subtrees of the updated node itself.

Figure 6:
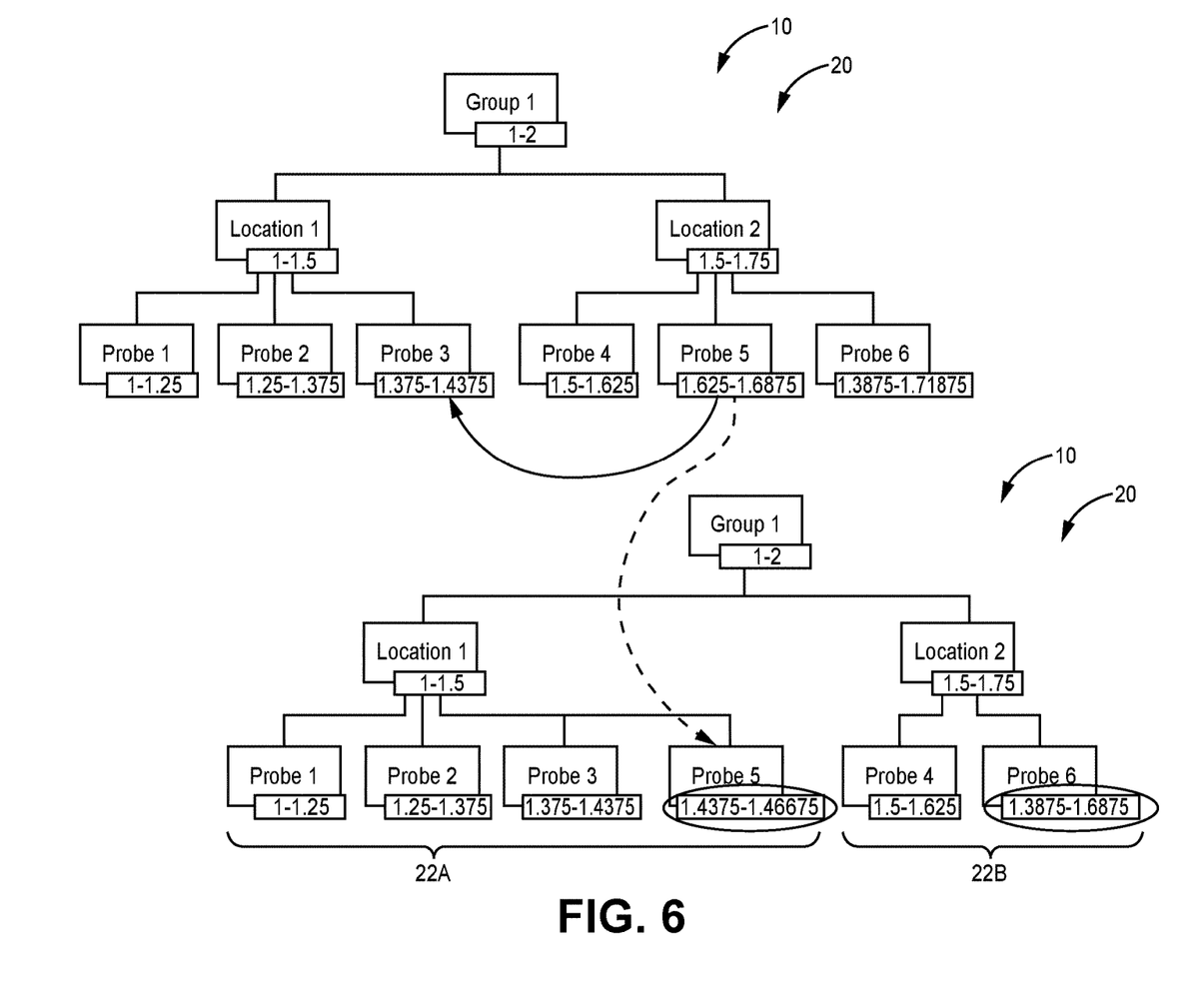
FIG. 6 is a schematic depiction of the system where one node is moved, according to one implementation.

FIG. 6 shows one exemplary implementation of the updates to a subtree that must be made when a node (here Probe 5) is moved from Location 2's subtree 22B to Location 1's subtree 22A. In these implementations, only the values of Probe 5 and Probe 6 must be recalculated. This principle can be applied across a data set. By fixing the values at the top of the tree, when updates are made to the data set the number of recalculation operations is significantly lower, and therefore any updates can be made faster and more efficiently than with prior systems.

Further, the use of nested interval data sets—with infinite series—allows for maintaining support for datasets having hundreds of millions or billions of items. It is understood that, the size of the dataset is only limited by disk space and the supported fidelity of mantissa of the relational database. That is, implementations are only limited by the quantity of numbers supported after the decimal point.

Figure 7:
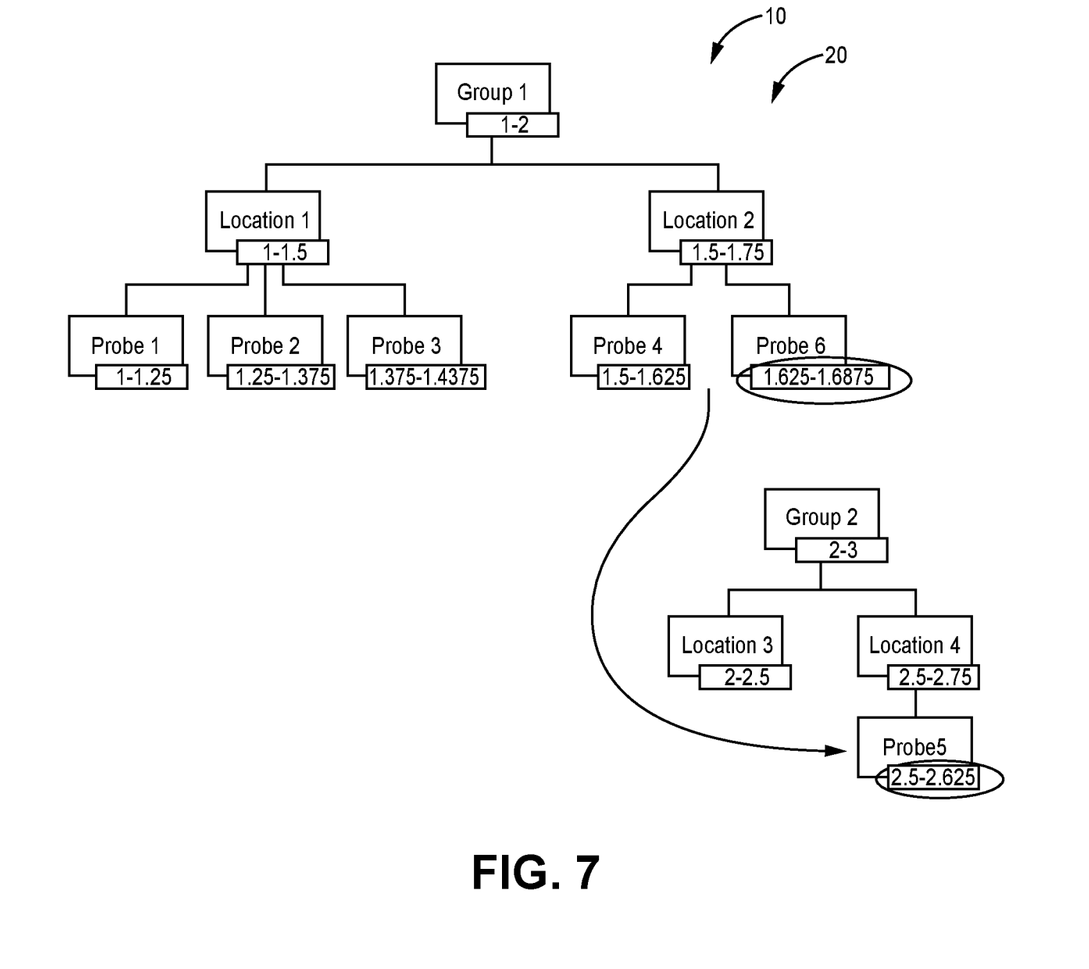
FIG. 7 is a schematic depiction of the system wherein one node is moved, according to one implementation.

In a further implementation, nodes may be moved between trees, as shown in FIG. 7. In this specific example, Probe 5 is moved from the Location 2 subtree of Group 1 to the Location 4 subtree of Group 2. When moving a node between trees only those sibling nodes to the right of the updated node and updated node itself and each node's respective subtrees have to be recalculated. By reducing the number of recalculation operations that must be performed when updating the data set the data structure and system 10 are more efficient.

Figure 8:
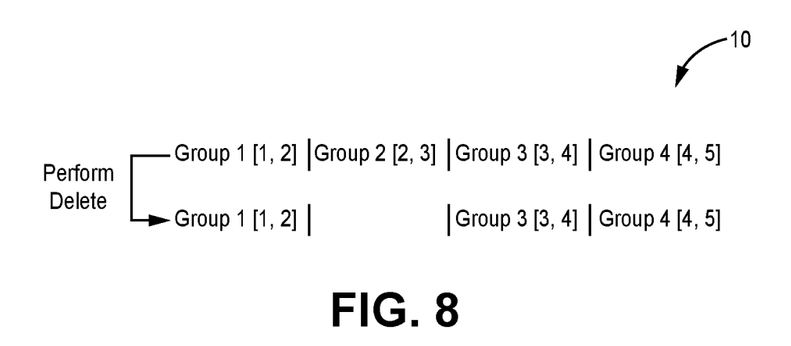
FIG. 8 is a schematic depiction of the system with a node removed, according to one implementation.

In a still further implementation, the system 10 automatically and/or periodically can adjust the data structure to accommodate for gaps—de-gapping the structure. As shown in FIG. 8, if a tree, root node, or other node is deleted from the data structure, a gap is created. In one particular example, the data structure had Groups 1-4 then Group 2 was deleted leaving a gap between values 2-3, as shown. In these and other implementations, the system 10 is constructed and arranged to fill the gap/de-gap the structure.

If the structure is not de-gapped, at least periodically, gaps will form as various nodes are deleted and the gaps are not be filled. In implementations where the data set is continuously/frequently deleted from or otherwise updated numerous gaps will form. In some implementations, databases can only store values up to a certain maximum value, if the data structure is not de-gapped the maximum number of nodes or disk storage space will be reached more quickly, and space will be wasted creating inefficiency within the data structure.

For example, disk space may be exhausted, encoded tree information density may be reduced, and mathematical efficiencies for queries and operations within the system 10 may be reduced in the data structure contains a plurality of gaps. It is further understood that because mantissa is a limitation on the size of the dataset, de-gapping the dataset important to increase information density and create a more efficient data set and system 10.

Figure 9:
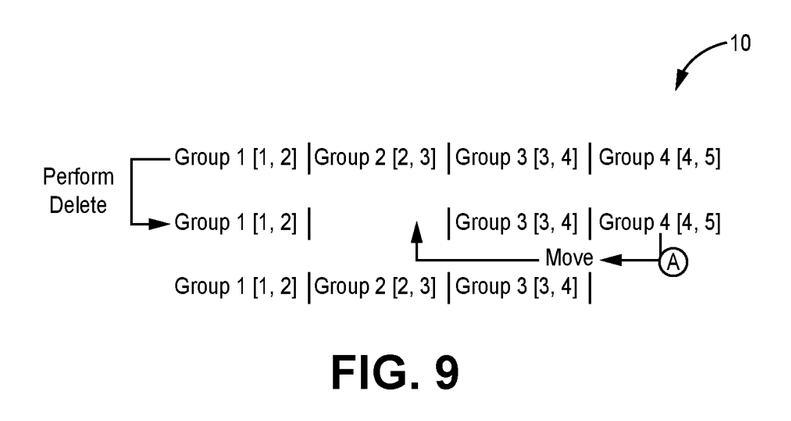
FIG. 9 is a schematic depiction of de-gapping the system of FIG. 8, according to one implementation.

In various implementations, de-gapping can be performed and optimized by the system 10 to increase efficiency and decrease wasted space within the data structure. In various implementations, a processor is constructed and arranged to execute a series of steps to de-gap the data structure. As shown in FIG. 9, after a node is deleted—as described in reference to FIG. 8—the furthest sibling node to the right is moved into the gap created by the deleted node, shown at arrow A in FIG. 9. In these implementations, only the values for the node that is moved, and its subtree must be recalculated. This processing of de-gapping can be applied at any level of a tree.

In various implementations, as nodes are deleted or moved and gaps created, the system 10 can record the node and gap location in a database table, or other storage mechanism such as in memory, on a disk, or other structure as would be appreciated. Then, periodically or continuously the system 10 can loop through the database table to fill gaps and recalculate only the necessary nodes for each gap. In various implementations, once a gap has been filled the entry on the database table is removed. By storing information related to gaps the system 10 no longer must search the entire data set, which may be an extremely large data set, for gaps and instead the system 10 can immediately identify and fill gaps further optimizing the creating efficiency within the system 10.

In various implementations, the system 10 is constructed and arranged to minimize the number of gaps. By minimizing gaps, it is possible to increase the efficiency of the nested interval with adjacency matrices data structure and/or other derivative tree encoding systems as would be appreciated by those of skill in the art.

For example, the system can be constructed and arranged to use the stored information regarding gaps when creating new entries, such that where appropriate a new entry is made in the gap space rather than as a sibling to the right of the rightmost node. If no gaps are located at the appropriate level of the data structure a new sibling node can be created to the right of the rightmost node. In some of these implementations, and as noted above, as gaps are filled, the corresponding gap entries are removed from the database table or other storage structure keeping the information regarding gaps.

Figure 11:
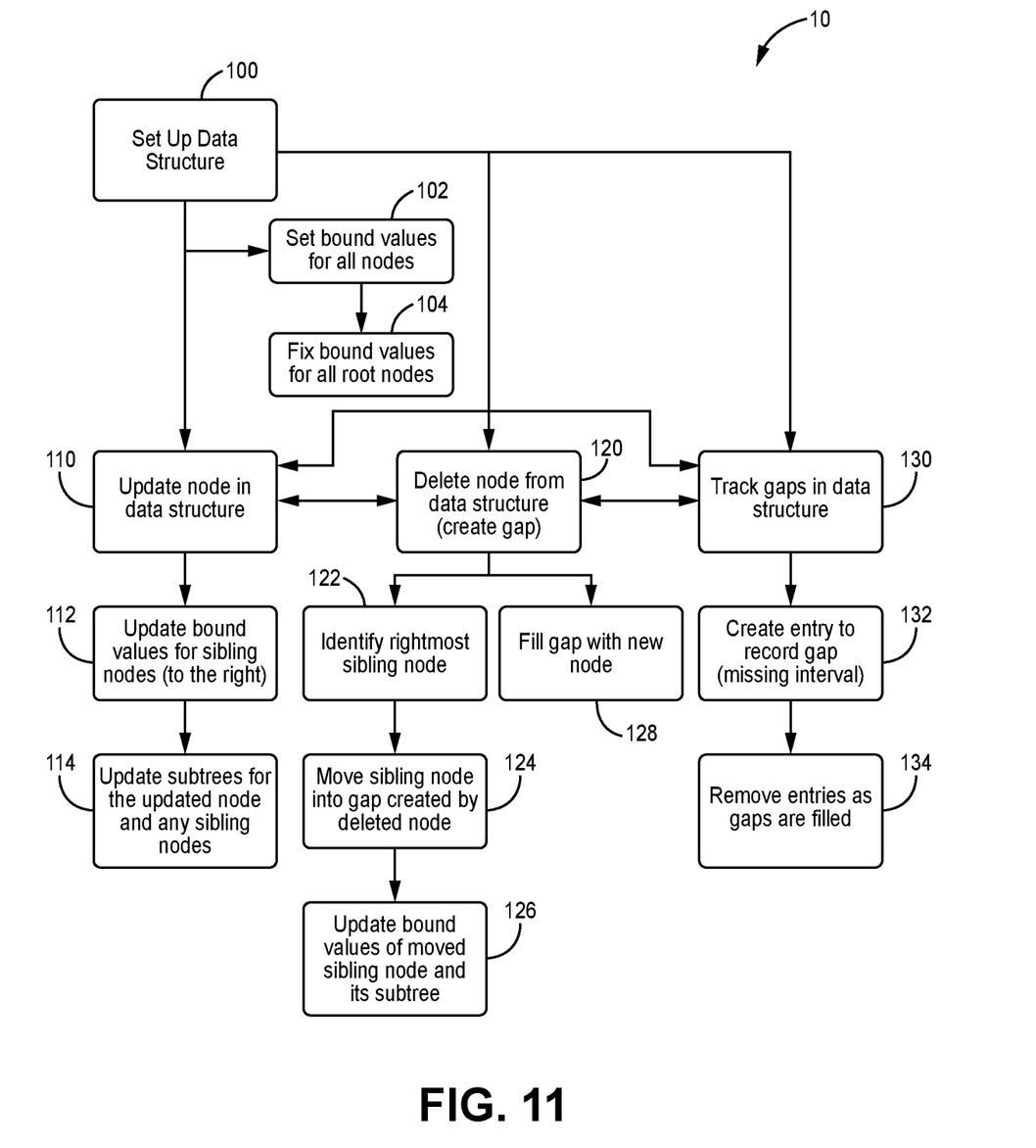
FIG. 11 is a process diagram depicting the system, according to one implementation.

FIG. 11 depicts the system 10 with various optional steps and sub-steps that can be performed in any order. Further the various steps and sub-steps are cyclical, in that the steps and sub-steps can be performed more than once. In various implementations, the steps and sub-steps are executed on a processor that may be connected to a computer-readable media storage device.

In one optional step, the system 10 is constructed to set up the data structure (box 100). In an optional sub-step the system 10 is constructed and arranged to set bound values for all nodes (box 102). In another optional sub-step the system is constructed and arranged to fix bound values for all root nodes (box 104), such that the bound values for the root nodes do not change and are all of equal numerical width.

In another optional step, the system 10 is constructed and arranged to update nodes in the data structure (box 110), such as by moving, deleting, or adding nodes and updating the bound values of the node. In another optional step, the system 10 updates bound values for sibling nodes to the right of the updated node (box 112). In another optional step, the system 10 updates the subtree(s) for the updated nodes and any sibling nodes that were also updated (box 114).

In another optional step, the system 10 is constructed and arranged to delete nodes from the data structure, thereby creating gaps in the data structure (box 120). In further optional step, the system 10 identifies the rightmost sibling node to the gap (box 122). The system 10 in another optional step may move the rightmost sibling node into the gap created by the deleted node (box 124). In another optional step, the system 10 can update the bound values of the moved sibling node and its associated subtrees (box 126), as applicable. In another optional implementation, the system 10 is constructed and arranged to fill gaps in the data structure by placement of a new node in the gap (box 128).

In another optional step, the system 10 is constructed and arranged to track gaps in the data structure 130. In another optional step, the system 10 creates entries in database table or other storage device to record gap locations/missing intervals (box 132). In a further optional step, the system 10 can remove entries from the database table or storage device as gaps are filled (box 134).

Figure 10:
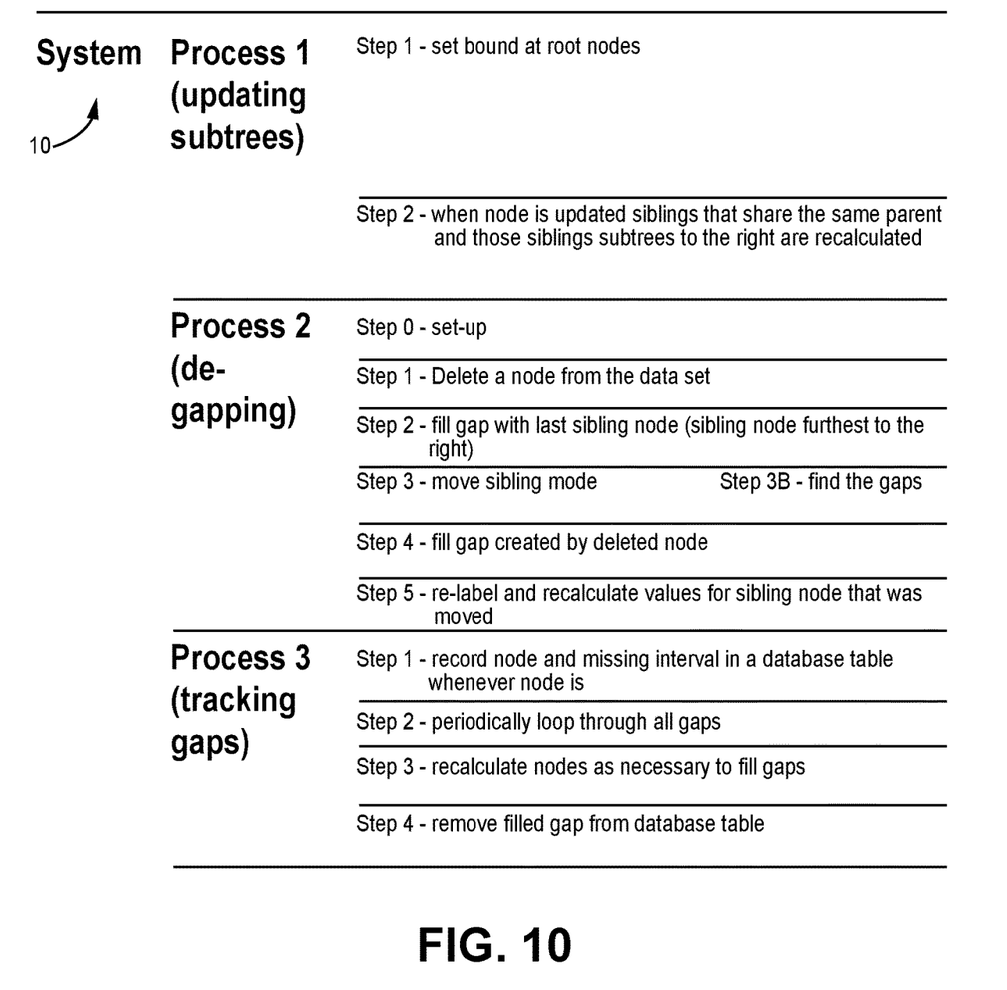
FIG. 10 shows various processes of the system, according to one implementation.

The various optimizations and efficiencies in the nested interval with adjacency matrices hierarchical system described herein and shown in FIGS. 10 and 11 allow for the system 10 to be used in high capacity, frequently changing environments such as car production.

Figure 12:
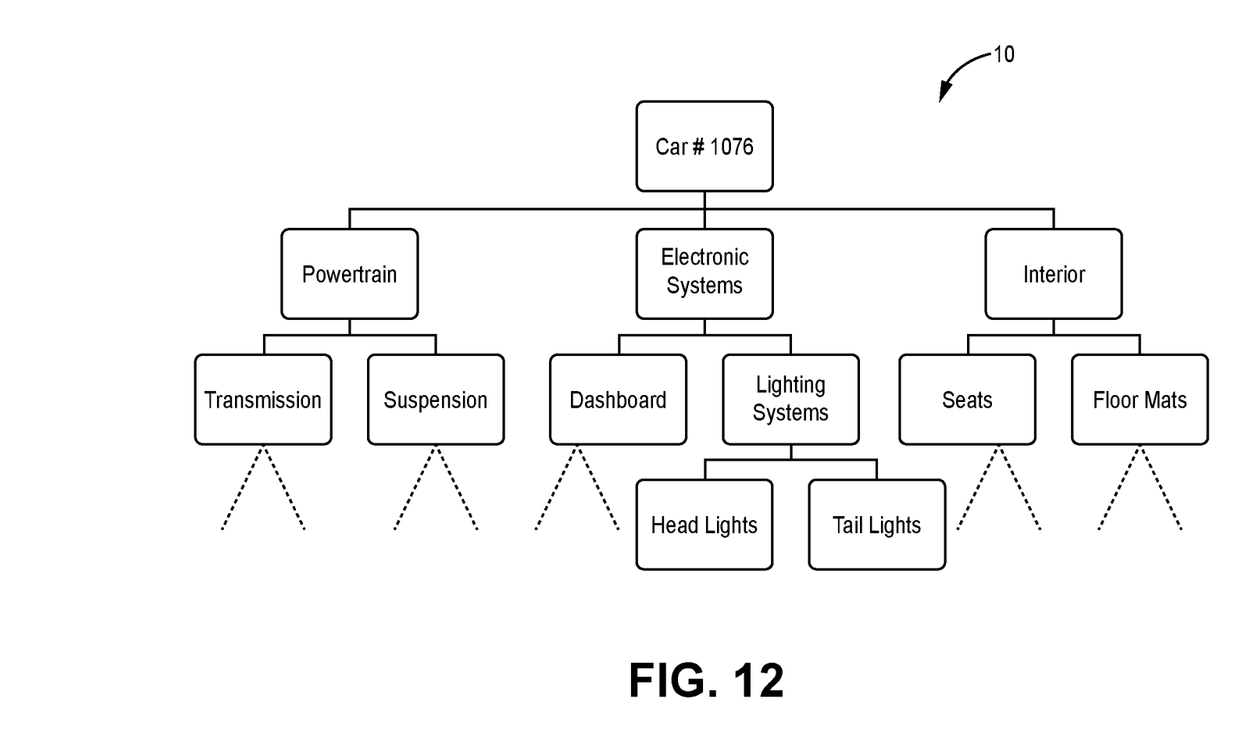
FIG. 12 is a schematic depiction of the system in use for a car factory, according to one implementation.

FIG. 12 depicts one specific implementation of the described system 10. In this implementation a nested interval with adjacency matrices data structure is used in connection with the manufacture and assembly of a car. As a car moves through production numerous parts are added to the car. The various parts make up a plurality of systems and subsystems (shown as nodes arranged in various trees and subtrees), all necessary for the complete assembly of the car. A car production company may utilize the described system 10 to efficiently track and update manufacture and assembly information.

In one specific example, a manufacturer may produce 6 million cars per year, equivalent to 16,000 cars per day. On average, a car has around 30,000 parts, therefore about 480 million nodes would be added and removed from the system 10 everyday—reflecting the addition/removal of parts from physical cars—in this example.

Continuing with this example, and as shown in FIG. 12, Car #1076 is moving through the production facility and as various parts are added to Car #1076 nodes corresponding to the parts are added to Car #1076's tree within the data structure. When the car is completed, its tree can be verified for completion to ensure that all necessary parts have been added to the car, indicated by the presence of corresponding nodes within the tree. After the car is completed and the tree verified, the tree can be deleted from the system 10.

Utilizing the system 10 described herein, the number of recalculations necessary is minimized. In this example, if the trees of two cars had to be fully updated, about 60,000 nodes within the data structure would need to be updated. With 480 million operations affecting 60,000 nodes this equates to roughly about $2.88 \times 10^{13}$ recalculations that would need to be performed to fully update the data structure. Assuming a 1-GHz single core processor can perfectly perform 1 operation on the data structure each cycle of the processor, then 1 billion operations can be completed on the data structure every second; then with a 1-GHz single core processor these recalculations would take about 8 hours to complete. As is typical with servers today, the system 10 may include 16 4-GHz quad core processors—which when operating perfectly (1 operation per clock cycle of the processor) can perform 256 billion operations per second—and as such the system 10 would take approximately 1 minute 52.5 seconds to perform these recalculations. Of course various factors may influence the runtimes described above, including but not limited to tree encoding, associated encodings (adjacency matrices) into relational databases as would be understood by those of skill in the art; as such the above example is given purely for illustrative purposes and is not to be construed as limiting.

If the car manufacturer, continuing with the example above, were to use a traditional (prior known) hierarchical structure—such as a system comprising a tree expressed or encoded with a nested interval with adjacency matrices without the optimizations described herein every time a part is added to or removed from any car in the production facility the entire nested interval set would have to be recalculated for that car and for every car in the system. Said another way, the prior known structure would have to recalculate every bound value of every node in the structure.

With 480 million nodes being added and removed from the prior known structure every day and each operation having to recalculate every value, every day the prior known structure would have to perform $2.3 \times 10^{17}$ operations. With a 1-GHz single core processor, described above, it would take roughly 7.306 years to compute this number of recalculations. With 16 4-GHz quad-core processors, as described above, it would take approximately 10.42 days to compute this number of recalculations. The various optimizations and efficiencies described herein and shown in FIGS. 10 and 11 lead to a roughly 99.9875% improvement to the system 10 over these prior known structures. As stated above, the described runtimes are given purely for illustrative purposes and those of skill in the art would understand that a variety of factors can influence the runtime in various scenarios. Use of prior hierarchical data structures is not efficient nor practical and would not be possible.

Although the disclosure has been described with references to various embodiments, persons skilled in the art will recognized that changes may be made in form and detail without departing from the spirit and scope of this disclosure.

What is claimed is:

1. A system for storing and managing hierarchical relationships comprising:
   a stored data set comprising:
      a first tree comprising a first root node and at least one first subtree;
      a second tree comprising a second root node and at least one second subtree; and
      a plurality of parent, child, and sibling nodes withing the first subtree and second subtree;
   a processor constructed and arranged to execute a series of commands; and
   an affected node that is a node that is inserted, moved, or deleted,
   wherein:
      each root, parent, child, and sibling node comprises bound values and the bound values of the first root node and the second root node are fixed and of equal numerical width,
      the processor is constructed and arranged for calculating and recalculating bound values for the affected node, for sibling nodes to the right of the affected node, and nodes of subtrees associated with the affected node and sibling nodes to the right of the affected node.

2. The system of claim 1, wherein the stored data set is arranged as a nested interval set with adjacency matrices.

3. The system of claim 1, wherein the data set is stored on a server.

4. The system of claim 1, wherein the processor is constructed and arranged for inserting new nodes into the data set.

5. The system of claim 1, wherein gaps are created in the data set when nodes are deleted.

6. The system of claim 5, further comprising a gap table wherein:
   the gap table is constructed and arranged to store data regarding gaps within the data set and
   an entry is created in the gap table when a gap is created within the data set.

7. The system of claim 6, further wherein the gap table is constructed and arranged to remove the entry when the gap is filled.

8. The system of claim 1, wherein each sibling node has a bound value width equal to half the bound value width of the sibling node to its immediate left.

9. A method for storing and managing hierarchical data sets comprising:
   arranging a data set comprising a plurality of nodes into trees and subtrees;
   calculating and assigning bound values to each of the plurality of nodes;
   fixing the bound values for root nodes such that the bound values for root nodes are of equal width;
   updating a node;
   recalculating bound values for sibling nodes to the right of the updated node that share the same parent node as the updated node and the subtrees of the updated node and any recalculated nodes;
   tracking gaps created within the data set;
   storing in a gap table data of gaps created in the data set; and
   de-gapping the data set periodically or continuously.

10. The method of claim 9, further comprising inserting a new node into a gap within the data set.

11. The method of claim 10, further comprising inserting a sibling node into a gap and recalculating any subtrees of the sibling nodes.

12. The method of claim 11, further comprising removing the gap data from the table when the gap is filled.

13. The method of claim 9, wherein each sibling node has a bound value width equal to half the bound value width of the sibling node to its immediate left.

14. A system for managing data sets comprising:
   a server;
   a processor in communication with the server, the processor constructed and arranged to execute a series of steps; and
   a nested interval plus adjacency matrix data set stored on the server,
   wherein:
      the data set comprises a plurality of root, parent, sibling, and child nodes, each node comprising bound values;

the bound values of root nodes are fixed and of equal width; and the processor is constructed and arranged to update a node and recalculate bound values of the updated node, the sibling nodes to the right of the updated node having the same parent node, and respective child nodes of the updated node and the updated sibling nodes.

15. The system of claim 14, wherein the processor is further constructed and arranged to de-gap the data set.

16. The system of claim 15, further comprising a gap data table constructed and arranged to store data regarding gaps in the data set.

17. The system of claim 16, wherein the processor is further constructed and arranged to insert new nodes into gaps in the data structure.

18. The system of claim 17, wherein the gap data table is stored on the server.

19. The system of claim 15, wherein the processor is further constructed and arranged to fill gaps in the data set by moving a sibling node into the gap and recalculating bound values for the moved sibling node and the subtree of the moved sibling node.

20. The system of claim 14, wherein each sibling node has a bound value width equal to half the bound value width of the sibling node to its immediate left.

* * * * *